UNITED STATES PATENT OFFICE.

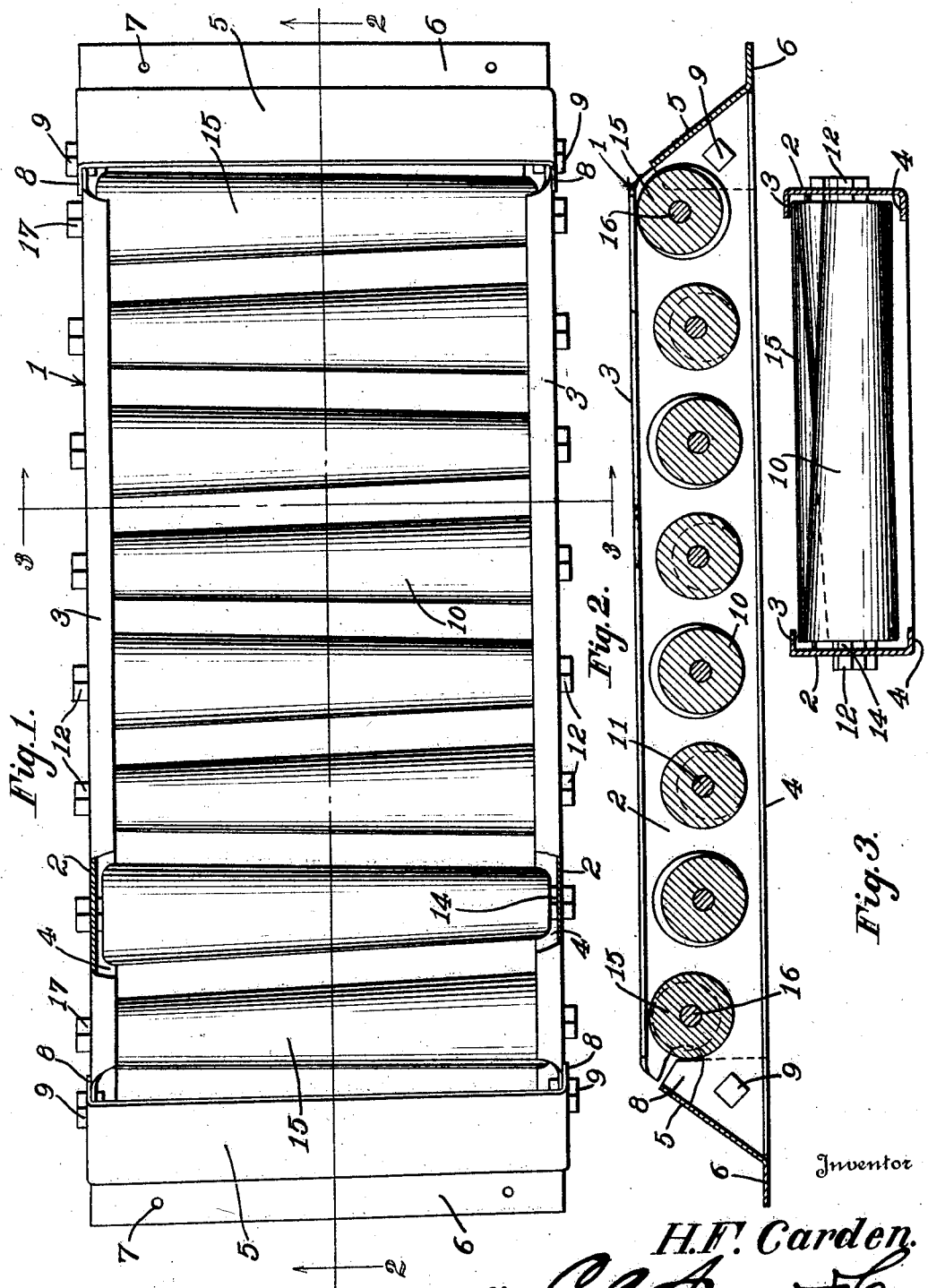

HARRY F. CARDEN, OF LAWRENCEBURG, TENNESSEE, ASSIGNOR TO LUTHER W. CARDEN, OF LAWRENCEBURG, TENNESSEE.

CATTLE GUARD.

1,406,343. Specification of Letters Patent. Patented Feb. 14, 1922.

Application filed July 30, 1921. Serial No. 488,535.

*To all whom it may concern:*

Be it known that I, HARRY F. CARDEN, a citizen of the United States, residing at Lawrenceburg, in the county of Lawrence and State of Tennessee, have invented a new and useful Cattle Guard, of which the following is a specification.

The device forming the subject matter of this application is a cattle guard embodying rollers, and the invention aims so to locate and construct the rollers that a surface will be presented which will be exceedingly offensive to cattle and prevent the cattle from traversing the guard.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a device constructed in accordance with the invention; Figure 2 is a section on the line 2—2 of Figure 1; Figure 3 is a section on the line 3—3 of Figure 1.

In carrying out the invention, there is provided an approximately rectangular frame 1, made up of side plates 2 having upper flanges 3 and lower flanges 4, the flanges 3 and 4 extending inwardly. The frame 1 includes inclined end members 5, supplied at their lower edges with outstanding flanges 6 having openings 7 whereby the frame may be secured to the ties of a railroad track. The end members 5 have wings 8 overlapped on the side plates 2 and connected thereto by securing elements 9.

Disposed within the frame 1 are a plurality of intermediate frusto-conical rollers 10 carried by shafts 11 which are disposed in the same horizontal plane. Nuts 12 are mounted on the ends of the shafts 11 and engage the side plates 2 to hold the shafts 11 in the frame. If desired, spacers 14 may be mounted on the shafts 11, between the ends of the rollers 10 and the side plates 2 of the frame. The smaller ends of alternate ones of the rollers 10 are disposed at one side of the frame, and the smaller ends of the others of the rollers 10 are disposed at the opposite side of the frame. The device includes terminal rollers 15 of frusto-conical form, carried by shafts 16 secured in the side plates 2 in the way hereinbefore described and designated by the numeral 17. The upper portions of the rollers 15 are tangential to a plane parallel to the axes of the rollers 10, the said plane being disposed above the rollers 10.

Owing to the fact that the smaller ends of alternate ones of the rollers 10 are disposed at one side of the frame, whereas the smaller ends of the other rollers are disposed at the opposite side of the frame, and owing to the fact that the upper portions of the terminal rollers 15 are disposed tangential to a plane parallel to the axes of the rollers 10, but disposed above the said rollers, an unusually effective surface is presented, for the purpose of preventing stock from traversing the rollers. This detail will be understood readily when Figures 3 and 1 are compared. The flanges 3 extend over the ends of the rollers 10 and 15, forming an effective protection against the accumulation of dirt and the harmful effects of the weather.

What is claimed is:—

1. A cattle guard comprising a frame and tapered rollers journaled in the frame and located side by side, the smaller ends of alternate rollers being disposed at one side of the frame, and the smaller ends of the other rollers being disposed at the opposite side of the frame.

2. A cattle guard comprising a frame, and tapered intermediate and terminal rollers journaled in the frame and located side by side, the smaller ends of alternate rollers being disposed at one side of the frame and the smaller ends of the other rollers being disposed at the opposite side of the frame, the axes of the intermediate rollers being disposed in a common plane, and the upper portions of the terminal rollers being disposed tangential to a plane, parallel to the axes of the intermediate rollers but located above the intermediate rollers.

In testimony that I claim the foregoing as my own, I have hereto affixed my signature in the presence of two witnesses.

HARRY F. CARDEN.

Witnesses:
 LURLINE R. FREEMON,
 W. E. SMITH.